July 26, 1932.  A. W. MINER  1,869,162

MOLDED INSERT FOR COMPOUNDS

Filed Dec. 26, 1929

Inventor
Anson W. Miner
By Wooster & Davis
Attorneys.

Patented July 26, 1932

1,869,162

UNITED STATES PATENT OFFICE

ANSON W. MINER, OF WATERBURY, CONNECTICUT, ASSIGNOR TO THE WATERBURY BRASS GOODS CORPORATION, OF WATERBURY, CONNECTICUT, A CORPORATION OF CONNECTICUT

MOLDED INSERT FOR COMPOUNDS

Application filed December 26, 1929. Serial No. 416,433.

This invention relates to metal inserts for attaching metal or other elements to members formed from molded compounds, such for example as securing electrical contacts in attachment plug caps and the like, and has for an object to provide an improved construction of insert which will be firmly anchored and held in the molded material against turning therein, and which can be manufactured at low cost.

With the foregoing and other objects in view, the invention consists in certain novel features of construction and arrangement of parts as will be more fully disclosed in connection with the accompanying drawing.

In this drawing

Figure 1:
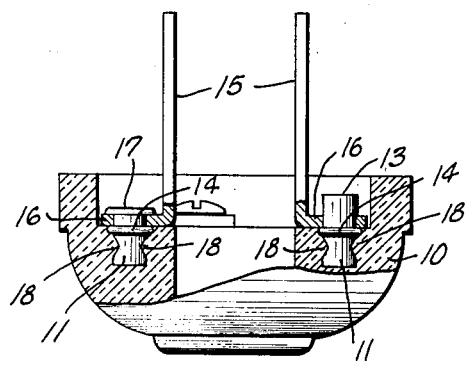
Fig. 1 is a partial side elevation and partial section of an attachment plug cap showing how the inserts may be used to secure the contact blades to the body of the cap.
Figure 5:
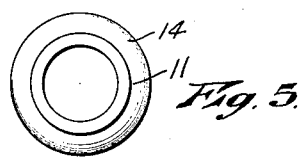
Fig. 5 is a top end view.
Figure 2:
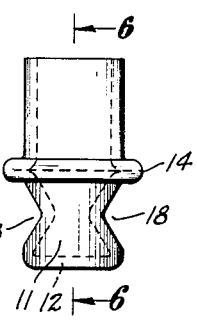
Fig. 2 is a side elevation of the insert on an enlarged scale.
Figure 4:
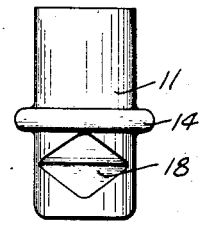
Fig. 4 is a side elevation looking from the right of Fig. 2.
Figure 6:
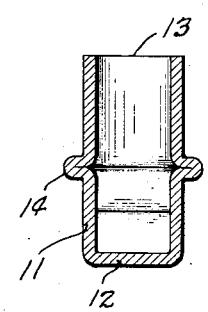
Fig. 6 is a vertical section substantially on line 6—6 of Fig. 2.
Figure 3:
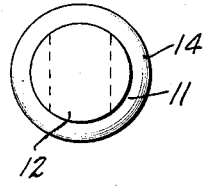
Fig. 3 is a lower end view thereof.

By way of illustration, and as an example only my improved insert is shown in Fig. 1 as used for securing knife blade contacts to the molded body of an attachment plug cap, but it is by no means limited to such use as it may be used for securing any element to a molded member.

In Fig. 1 the body of an attachment plug cap is shown at 10 molded of any suitable material. It is commonly of a plastic insulating material molded under pressure while heated. The inserts 11 are molded in the material while it is soft, usually being placed in the dies and properly located thereby and then the plastic material is molded around them. These improved inserts 11 comprise a drawn tube of metal preferably formed by cutting a blank from a strip of sheet metal and then drawing the blank into a tube of proper length and size. This insert is closed at one end by transverse wall 12 and is open at its opposite end 13. If desired, it may be formed intermediate its length with an outwardly extending flange 14 adapted to lie adjacent the surface of the molded material of the body 10 to assist in locating the insert therein and also in locating the metallic element on the insert.

As shown in Fig. 1 these elements are contact blades 15 each having a base member 16 provided with an opening to receive the upper portion of the insert. After the metal element is in position, the upper portion of the insert adjacent the open end is rolled over on the top of the base portion 16 as indicated at 17 to firmly secure the metal member in position on the insert and against the surface of the molded material. Adjacent the closed end the outer side walls are provided with one or more indentations or recesses 18 to receive the molded material while it is plastic so that after it hardens, it securely anchors the insert in the material and holds it from turning therein. These indentations are preferably formed on opposite sides of the insert adjacent its closed end. The closed end 12 effectively prevents the softened molding material from flowing into the insert during the molding operation.

The flange or bead 14 may be formed by holding the drawn insert in two relatively movable dies which confine the insert on its outer side at all points except where it is desired to form the flange or bead. By then exerting longitudinal pressure on the tube, the unconfined portion of the side wall is buckled outwardly by the pressure to form the bead 14. The indentations 18 may be formed by pressing the insert between two lateral die members to force the side walls inwardly as indicated.

Figure 7:
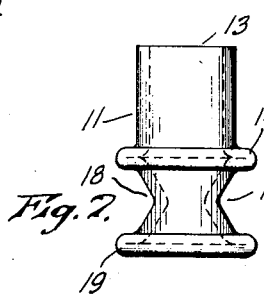
Fig. 7 is a side elevation of a slightly modified construction.
Figure 8:
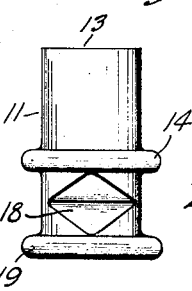
Fig. 8 is a view looking from the right of Fig. 7.

In the form shown in Figs. 7 and 8 the insert is drawn from sheet metal as in the first form but an additional bead or head 19 is provided adjacent the closed end and spaced from the bead 14. In this construction the indentations 18 are placed between the two beads as shown. This construction can be used either with or without the indentations or recesses 18. If used without these indentations the inserts are anchored against removal from the molded material by the bead or head 19, but if it is desired to also anchor it against turning in the molded material, then the indentations 18 can be used.

It is to be noted the tubes are circular or round and therefore the transverse indentations change the contour of the tubes through these indentations so it is out of round. Therefore when the molded material becomes set or hardened in these indentations the tube will not only be anchored against drawing out of the material but it will also be held against turning therein.

This construction makes a very effective insert. The closed end will prevent the molding material from flowing into the inside of the insert during the molding operation, and the indentations effectively anchor the insert in the molding material and prevent its turning therein. As the inserts are blanked and drawn from sheet metal they may be manufactured at relatively low cost.

Having thus disclosed the nature of this invention, what is claimed is:

1. An insert adapted to be anchored in a molded article comprising a round metal tube provided with one or more transverse indentations in its side wall, the circumferential extent of each indentation being limited by the wall of the tube so that the outer contour of the tube through the indentation is other than round, and the indentation being adapted to receive the molding material to secure the insert in the material and hold it against turning in the material.

2. An insert adapted to be anchored in a molded article comprising a round metal tube closed at its inner end by an integral transverse wall to prevent entrance of the molding material and provided with one or more transverse indentations in its side wall adjacent the closed end, the circumferential extent of each indentation being limited by the wall of the tube so that the outer contour of the tube through the indentation is other than round, said indentation being adapted to receive the molding material to secure the tube in the material and prevent its turning therein.

3. An insert for anchoring in a molded article comprising a round metal tube provided in a side wall thereof with a transverse substantially V-shaped indentation opening at its opposite ends through the sides of the tube, the circumferential extent of the indentation being limited by the wall of the tube so that the outer contour of the tube through the recess is other than round and molding material entering the recess will anchor the tube and hold it against turning.

4. An insert for securing an element to a molded member comprising a round metal tube closed at its inner end by an integral cross wall to prevent entrance of molding material, the side walls being folded outwardly to provide an external circumferential bead spaced from the said closed end, and the side wall between the bead and the closed end being also provided with a transverse substantially V-shaped indentation extending at its opposite ends through the outer wall of the tube so that the outer contour of the tube through the indentation is other than round and molding material entering the indentation will anchor the insert in the material and also prevent its turning therein.

In testimony whereof I affix my signature.

ANSON W. MINER.